United States Patent [19]

Holt et al.

[11] 3,910,820
[45] Oct. 7, 1975

[54] METHOD OF MAKING STARCH HYDROLYSATES BY ENZYMATIC HYDROLYSIS

[75] Inventors: Niels Christian Holt; Cornelis Bos, both of Holte; Knud Viggo Rachlitz, Tastrup, all of Denmark

[73] Assignee: DDS-Kroyer A/S, Copenhagen, Denmark

[22] Filed: July 5, 1973

[21] Appl. No.: 376,374

[30] Foreign Application Priority Data
July 5, 1972 United Kingdom............... 31499/72

[52] U.S. Cl................. 195/31 R; 195/11; 195/31 F
[51] Int. Cl.².......................................... C12D 13/02
[58] Field of Search............ 195/31 R, 11, 7, 68, 63

[56] References Cited
UNITED STATES PATENTS

| | | | |
|---|---|---|---|
| 2,583,451 | 1/1952 | Wallerstein et al.................. | 195/11 |
| 3,715,277 | 2/1973 | Dinelli................................. | 195/68 |
| 3,720,583 | 3/1973 | Fisher................................. | 195/31 R |
| 3,804,716 | 4/1974 | Langlois............................ | 195/31 R |

OTHER PUBLICATIONS

Van Twisk, "Neue Erfahrung bei der Herstellung von Starkeverzuckerungsprodukten aus Maisgrits," Die Starke 22, No. 7, pp. 228–230, (1970).
Van Twisk, "Enzymic Hydrolysis of Starch in Whole–Maize Grits", Chemical Abstracts, Vol. 73, p. 78, 26863r.

Primary Examiner—Lionel M. Shapiro
Assistant Examiner—Thomas G. Wiseman

[57] ABSTRACT

In a method of making starch hydrolysates by subjecting crude starch-containing materials to an enzymatic hydrolysis, a slurry of milled crude starch-containing material is pretreated at a temperature of between 50° and 65°C for a period of time of from 1 to 5 hours to swell the starch particles while avoiding the growth of microorganisms contained in the crude starch-containing material.

7 Claims, No Drawings

METHOD OF MAKING STARCH HYDROLYSATES BY ENZYMATIC HYDROLYSIS

BACKGROUND OF THE INVENTION.

A prior art method of making starch hydrolysates comprises the steps of subjecting a starch slurry to a liquefaction in the presence of a liquefaction enzyme, such as alpha-amylase, and subsequently subjecting the liquefied product thus obtained to a saccharification in the presence of a saccharifying enzyme, such as amyloglucosidase. The products thus obtained are hydrolysates having a high content of dextrose and/or maltose.

The starting materials used in the prior art processes for making starch hydrolysates normally are refined starches, such as refined corn starch or wheat starch.

It has been attempted to use unrefined starting materials, such as crude starch-containing soluble proteins, germs which contain substantial amounts of oil and gluten which is a protein-rich product, but said attempts have not been successful because in practice a satisfactory yield and purity have been unobtainable, and filtration of the hydrolysates obtained has been almost impossible.

One of the most serious problems involved in the use of crude starch-containing materials is that during the starch hydrolysis the insoluble proteins present in the starting material are converted into soluble products which are difficult to remove during the subsequent treatment and which, if allowed to remain in the final product, significantly reduce the purity of the final product.

The conversion of said insoluble proteins is due to the presence of proteases in the enzyme preparations ordinarily used.

In an attempt to eliminate these problems, it has been suggested (U.S. Pat. No. 3.249.512) to use amylase and/or amyloglucosidase which are substantially free of proteases.

A further prior art method (P. van Twisk: "Neue Erfahrungen bei der Herstellung von Starkeverzucherungsprodukten aus Maisgrits", Die Starke, Volume 22 (1970) No. 7 pages 228–230) comprises the step of heating a stirred dispersion of milled maize grits in water to a temperature of 40°C to swell the maize grits. While this method may be satisfactory under laboratory conditions, it has been found completely unsuitable for commercial production. Thus microorganisms present in the starting material grow very quickly at a temperature of 40°C and in a few days of continued production the fermentation of these microorganisms and particularly that of lactic acid producing bacteria is so high that large amounts of alkaline materials such as sodium carbonate have to be added in order to neutralize the acids formed, and to reestablish the pH-value of the slurry at 6–7. The addition of said alkaline materials not only increases the costs for obtaining the liquefied product but also the costs for refining the liquefied product or the final products e.g. by ion exchange treatment are increased. Furthermore the slimes formed by the microorganisms tend to reduce the filtration rate of the liquefied product or final product. Finally the acids formed by said microorganisms tend to form complexes with and deactivate the Ca ions which are added during or prior to the liquefaction step to protect the amylases against inactivation.

The object of the invention is to obtain high yields of a pure final product while avoiding these problems of the prior art method.

SUMMARY OF THE INVENTION.

The method of the invention comprises the step of subjecting a slurry of a milled crude starch-containing product to a pretreatment before the addition of enzymes, said pretreatment comprising the step of heating the slurry to a temperature of between 50 and 65°C for a period of time of from 1 to 5 hours.

In an enzymatic liquefaction of starch, the starch slurry containing added liquefaction enzyme is normally quickly heated through the gelatinization range of the starch to a temperature of 80-90°C in order to effect a rapid enzymatic decomposition of the starch and thus to reduce the viscosity of the gelatinized starch slurry.

In the pretreatment in the method of the invention, no enzymes are added and the starch slurry is heated to a temperature below the gelatinization temperature of the starch and maintained at said temperature for a considerable period of time. During said pretreatment the starch absorbs water and swells but no significant gelatinization takes place.

As a result of the water absorption obtained during the pretreatment, the attack of the starch molecules by the liquefaction enzymes during the subsequent liquefaction step at temperatures of between 80° and 105°C is facilitated. Consequently, the necessary liquefaction time can be reduced and the well known retrogradation which is effected when starch and especially the amylose fraction thereof is heated over long periods of time can be avoided. Such a retrogradation results in the formation of products which subsequently cannot be broken down and therefore cause difficulties in the subsequent filtration and reduce the yield of the final product.

The elimination of these retrogradation products and the obtaining of a complete liquefaction makes it possible to filter the liquefied product. Such a filtration of the liquefied product has previously been considered to be undesirable partly due to the presence of said retrogradation products which make such a filtration difficult to perform and partly because the partially converted product or a product containing free starch has a higher viscosity than the conversion product formed after subjecting the liquefied product to further treatment, for example a saccharification.

As set forth above, the liquefaction enzyme preparation is added when the pretreatment has been completed. This is due to the fact that the activity of alpha-amylase may be reduced if alpha-amylase is present in the starch slurry during the pretreatment. Thus, it appears that Ca ions, which normally are added to the starch slurry in order to protect the alpha-amylase against inactivation, form complexes with the proteins during the pretreatment. Furthermore, it appears the crude starch-containing materials contain some inhibitors for the alpha-amylase which inhibitors are active at temperatures of between 50° and 65°C.

As a result of the heating of the starch slurry to a temperature of between 80°–105°C immediately after the addition of the liquefying enzymes, the Ca ions seem to be liberated from the complexes with the proteins and become active again as far as the protection of the liquefying enzyme is concerned. Furthermore, the inhibitors present in the crude starch-containing material become inactivated at the higher temperatures.

In order to counteract these adverse factors, it is preferred to add a small portion of the liquefaction enzymes to be used immediately after the pretreatment and to add the remaining portion of the liquefying enzymes at a later stage. It is particularly preferable to add the remaining portion of the liquefying enzymes at a stage of the liquefying step where the temperature has been somewhat lowered. By adding the remaining portion of the liquefying enzymes at said lower temperature, the enzymes are less prone to be deactivated by heat and consequently a more complete liquefaction is obtained.

The fact that it is possible to filter the liquefied product before it is subjected to further treatments, for example to a saccharification, is very important because said filtration results in the removal of insoluble proteins which might be converted into soluble proteins during the subsequent treatments, for example under the influence of proteases present in the enzymes used for the subsequent saccharification step. Since the saccharification is effected at a temperature of about 60°C, such proteases are highly effective on converting insoluble proteins into soluble proteins during said saccharification.

As a result of the removal of insoluble proteins during said filtration, such a conversion can be substantially eliminated and the purity of the final product is consequently increased. Thus, by avoiding the retrogradation products and by reducing the amount of soluble proteins in the final product, a significantly higher yield and purity can be obtained by the method of the invention than in the prior art methods.

As mentioned above, the pretreatment is effected at a temperature of between 50° and 65°C. The use of higher temperatures than 65°C results in an undesired gelatinization while the use of lower temperatures results in a fermentation initiated by bacteria and fungi, such as lacti acid bacteria and yeast fungi present in the starting material as described above. The activity of said bacteria and fungi is insignificant at temperatures of above 50°C. By avoiding such a fermentation, the need for adjusting the pH-value so as to compensate for the lactic acid and other acids formed is eliminated and there is also no need for removing lactic acid or added materials from the final product. Moreover the formation of slimes which tend to reduce the filtration rate is avoided.

As mentioned above, the filtered liquefied product may be subjected to an enzymatic saccharification so as to obtain a hydrolysate of a high DE value. If necessary, said product is finally refined, for example by treatment with active carbon and by ion exchange.

Instead of subjecting the filtered liquefied product having a DE value of between 15 and 35 to a saccharification, the hydrolysate thus formed may also be refined by treatment with active carbon and by ion exchange. The refined product thus obtained may then be concentrated by evaporation so as to obtain a highly concentrated liquid product or a product which, if desired, may be dried.

In a preferred aspect of the invention, the saccharification of the refined filtered liquefied product is preferably effected by means of enzymes which are capable of being mechanically separated from the final product after the saccharification. Examples of such enzymes are commercially available insoluble enzymes or encapsulated or coupled enzymes. By effecting the saccharification with such enzymes, the saccharification step can be effected continuously, for example in saccharification columns.

The saccharified product having a high content of dextrose and/or maltose, may also be converted into fructose by means of such enzymes which can be mechanically separated from the product formed. Also this treatment can be effected continuously in suitable reaction columns.

The invention will now be described in further detail with reference to the following examples.

EXAMPLE I

Dry milled maize grits are slurried with hot water (60°C). The slurry is kept for 1½ hours at 60°C and is continuously agitated. The concentration is 30 percent w/w. The pH is kept between 6.4 and 6.6 with dilute sodium carbonate solution. Also $CaCl_2$ solution is added at a concentration of 0.5 gm calcium ions/litre slurry.

After 1½ hours retention time alpha-amylase is added into the slurry at a concentration of 1.2 gms per kg dry substance just before the slurry is pumped through a converter tube where the temperature is raised to 89°C. After the converter tube, an additional amount of alpha-amylase is added, 1.4 gms per kg dry substance and the slurry is kept at 85°C for an additional 3 hours.

The pH is then adjusted to 4.8 and the slurry filtered. The hydrolysate obtained is crystal clear and has a DE value of between 28 and 32.

EXAMPLE II

A hydrolysate prepared as described in Example I and having a concentration of 28 percent dry substance w/w is passed through ion-exchange columns and/or active carbon and then concentrated to a concentration of 80 percent dry substance w/w syrup. This product is then spray-dried, to produce a white free flowing non-hygroscopic powder.

EXAMPLE III

A filtered hydrolysate prepared as described in Example I is put in saccharification tanks, the temperature is adjusted to 60°C and saccharification enzymes (amyloglucosidase) are added at a concentration of 2.4 gms/kg dry substance, and the solution continuously agitated for 48–72 hours. The product which then has a DE of 97–99 is then refined by means of ion-exchange and active carbon, and concentrated to 74 percent dry solids w/w and put in crystallizers, where dextrose monohydrate crystallizes out. The crystals are washed and dried to form pure dextrose monohydrate. Alternatively, after refining the dextrose liquor, it is concentrated to 85–92 percent dry substance w/w and spray crystallized to produce a "total sugar" having a DE value of between 97–99 and a moisture content of less than 1 percent.

EXAMPLE IV

A filtered hydrolysate prepared as described in Example I is saccharified with maltose enzymes to 50 DE, the resultant liquors are refined by means of ion-exchange and active carbon, concentrated to 80–85 percent dry substance w/w to produce syrups. The syrups are spray-dried to produce white free flowing powders.

EXAMPLE V

A filtered hydrolysate prepared as described in Example I is saccharified to a DE of 42 in the following manner:

0.5 gms enzyme (amyloglucosidase) per kg dry substance is added to the filtered hydrolysate, the temperature adjusted to 60°C, and the mix kept for 12 hours under continuous agitation. The temperature is quickly adjusted to 80°C after 12 hours, to inactivate the enzyme and the resulting liquor is then refined by means of an ion-exchanger and active carbon and concentrated to 80–82 percent dry substance w/w to form a syrup.

By varying the saccharification times between 2 and 24 hours, final DEs of 35–65 are obtainable.

EXAMPLE VI

A refined liquor prepared as described in Example II is further saccharified by means of encapsulated enzymes as follows:

The liquor has a dry substance content of 28 percent by wt - the enzyme is retained in an inactive substrate and fixed into a column. The activity of the enzyme in the substrate is for amyloglucosidase 250 GU/gms.

The pH Of the refined liquor is adjusted to 4.8, the temperature of the column and liquor adjusted to 50°C and the liquor percolated through the column. The average contact time is 30 minutes and the DE has risen to 96.

This liquor is then refined with active carbon, concentrated to 74 percent solids by wt. Dextrose monohydrate is prepared from the syrup obtained in the manner described in Example III.

EXAMPLE VII

A refined liquor prepared as described in Example III is isomerase as follows:

The liquor is concentrated to 50 percent dry substance w/w. The pH is adjusted to 6.5 and the temperature is adjusted to 67°C. Insoluble glucose isomerase is added at a concentration of 4.4 gms/kg dry substance, and isomerisation is carried out for 40 hours. The pH during the reaction is kept at 6.5 by means of dilute sodium carbonate and the temperature is kept constant at 67°C. After 40 hours the resultant mix is filtered to recover the enzymes for further use and the liquor refined by means of ion-exchange and active carbon. The purified solution is concentrated to 70 percent dry substance w/w and the resultant syrup has a composition on the dry basis as follows:

48 percent fructose 52 percent dextrose.

EXAMPLE VIII

Glucose isomerase is encapsulated on an inert substrate as described in Example VII and a refined liquor obtained as disclosed in Example III concentrated to 50 percent dry substance w/w having an average DE of 98, is percolated through the column for ½ hour. The pH is 6.5 and the temperature 60°C. The concentration of the encapsulated enzyme is 1500 units/gm substrate. The isomerased syrup is refined by means of ion-exchange and active carbon and concentrated to 70 percent dry substance w/w.

The resultant syrup obtained has the following composition on the dry basis:

46 percent fructose 54 percent dextrose.

We claim:

1. A method of making starch hydrolysates which comprises the steps of heating a slurry of milled maize grits to a temperature of from 50° to 65°C., maintaining said temperature for a period of from 1 to 5 hours, and subsequently subjecting the heat-treated slurry to an enzymatic hydrolysis.

2. A method as in claim 1, wherein the enzymatic hydrolysis comprises the step of adding an α-amylase preparation to the heat-treated slurry and heating the slurry to a temperature of from 80° to 105°C. to form a liquefied starch product.

3. A method as in claim 2, wherein the α-amylase preparation is added in portions, the first portion being added immediately after the completion of the heat treatment and the subsequent portion of said α-amylase preparation being added at a temperature of from 70° to 85°C.

4. A method as in claim 2, wherein the liquefied starch product is filtered.

5. A method as in claim 4, wherein the filtrate is refined by treatment with active carbon or by an ion exchange treatment.

6. A method as in claim 4, wherein an amyloglucosidase preparation is contacted with the filtrate to effect a further hydrolysis.

7. A method as in claim 6, wherein the filtrate is percolated through a column comprising an immobilized amyloglucosidase preparation.

* * * * *